United States Patent [19]

Rutledge

[11] Patent Number: 4,503,676
[45] Date of Patent: Mar. 12, 1985

[54] APPARATUS FOR DIRECTLY CONVERTING THERMAL TO ROTATIONAL ENERGY

[75] Inventor: Donald R. Rutledge, Budd Lake, N.J.

[73] Assignee: AT&T Bell Laboratories, Murray Hill, N.J.

[21] Appl. No.: 567,051

[22] Filed: Dec. 30, 1983

[51] Int. Cl.³ ............................................. F03G 7/00
[52] U.S. Cl. ..................................... 60/527; 60/641.8
[58] Field of Search ............... 60/527, 528, 721, 641.8

[56] References Cited

U.S. PATENT DOCUMENTS 3,665,705  5/1972  Christensen ........................... 60/527
3,830,060  8/1974  Jedlicka et al. ....................... 60/527
4,175,390 11/1979  Koslow .................................. 60/527

*Primary Examiner*—Stephen F. Husar
*Attorney, Agent, or Firm*—J. W. Herndon

[57] ABSTRACT

Apparatus for directly converting thermal energy into rotational movement. A long shaft relative to its cross-section and made of an elastic material with a high thermal coefficient of expansion is equipped with a plurality of journals at prescribed points along its axial length. A corresponding number of fixedly mounted circular bearings receive the journals. The bearings are arranged to constrain the shaft into an elastic arc. Thermal energy is applied to all or a substantial part of the concave surface of the arced shaft. Means may be employed to force cool all or a portion of the convex portion of the arced shaft. As a result of this arrangement, the shaft elastically rotates about its axis within the bearings. Structure is disclosed for coupling the rotational movement of the shaft to a utilization device.

15 Claims, 7 Drawing Figures

APPARATUS FOR DIRECTLY CONVERTING THERMAL TO ROTATIONAL ENERGY

TECHNICAL FIELD

The invention relates generally to apparatus for converting energy from one form to another. In particular, the invention relates to apparatus for directly converting thermal to continuous rotational energy.

BACKGROUND OF THE INVENTION

Numerous arrangements have been studied and developed to convert thermal energy into mechanical energy for performing work. Most such arrangements operate indirectly to perform such an energy conversion. For example, one conventional technique is to generate steam with solar or some other form of thermal energy and to direct the steam through a turbine to generate rotary shaft power. A number of alternatives have been studied which also involve heating an appropriate medium to, in turn, thermodynamically or mechanically drive various devices such as piston, rankine and stirling engines. Such methods also involve an indirect conversion of energy.

Two methods of directly converting thermal energy to mechanical energy come to mind. The familiar bimetallic strip used in thermostats operates on the principle of differing coefficients of heat expansion of two bonded strips of metal. A spiral coil of such a bimetallic strip either contracts or expands as the ambient temperature changes. The bimetallic strip does not appear to be useful for generating significant amounts of mechanical energy. One reason for this is the complex linkages that would be required to convert the mechanical movement of such a strip to rotary shaft power. A more important reason is the fact that the bimetallic is not conveniently capable of generating continuous mechanical energy.

A second direct conversion method mentioned above concerns the well known pinwheel device most commonly used as a demonstration oddity. One surface of each vane of the pinwheel is dark and the opposite surface is reflective. The dark surfaces absorb more heat than the reflective surfaces. Illuminating the pinwheel causes it to rotate by means of a reactive force resulting from the expanding air adjacent the hotter dark vane surfaces. While this arrangement is capable of continuously generating rotational energy, it appears that no attempt has been made to utilize it for applications requiring significant amounts of power.

Thus, an arrangement for practical application and capable of continuously and directly converting thermal energy into shaft power of significant amounts is desirable.

SUMMARY OF THE INVENTION

An advance in the art is achieved in apparatus for directly converting thermal energy into rotational energy. A shaft of elastic material having a relatively high thermal coefficient of expansion is equipped with a plurality of journals located at prescribed points along the axis of the shaft. The length of the shaft is much greater than the dimensions of its cross-section. A plurality of circular bearings are arranged to receive the journals of the shaft when the shaft is in an arced elastic state. Part or all of the concave surface of the arced shaft is heated substantially along its entire length to a temperature higher than that of part or all of the convex surface of the arced shaft. As a result, the shaft continuously and elastically rotates on its journals within the bearings about its own axis as long as heat is applied to the continuously forming concave portion of the shaft surface during rotation.

Several variations of the invention are disclosed herein. In one embodiment, the shaft is arced in a planar spiral configuration for absorption of solar energy. A heating canopy is also disclosed for this embodiment by means of which the device may be continuously powered by other forms of generated thermal energy. Additional structure and techniques are disclosed for improving the efficiency of energy conversion by forced heating and cooling of only the concave and convex surfaces, respectively, of the arced shaft.

The shaft may be made of virtually any elastic material having sufficient shear resistance for the intended application and which has a relatively high thermal coefficient of expansion. In a preferred embodiment, the shaft is circular and hollow, thus forming a pipe. The wall of the pipe should be as thin as possible within the constraint that the wall remain elastic and not buckle as rotation occurs. Means are disclosed for coupling the rotational energy of the shaft to a utilization device.

DETAILED DESCRIPTION

Figure 1:
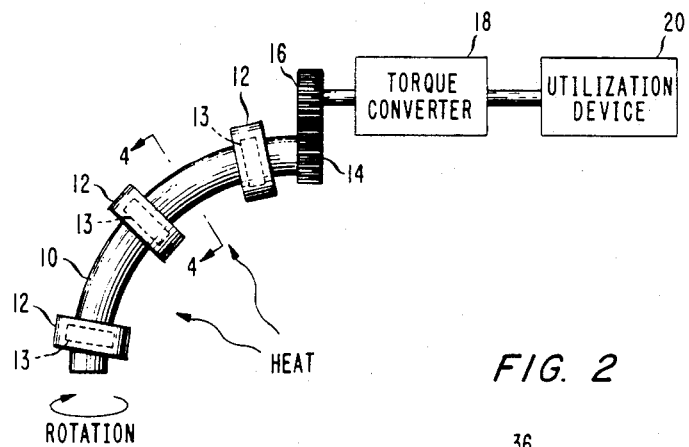
FIG. 1 shows one embodiment of the invention in which a circular shaft is constrained by bearings into one quadrant of a circle. This embodiment illustratively uses solar energy as a source of heat to cause rotation of the arced shaft.

FIG. 1 shows one simple embodiment of the invention comprising a 10, journals 13 located at prescribed points on the shaft and circular bearings 12 for receiving the journals. Shaft 10 is shown as having a circular cross-section throughout its length. This is for convenience and is not a limitation of the invention. It should be noted at the outset that the relative dimensions of the shaft and bearings are distorted in FIG. 1 and in the other FIGS. for clarity of description. It should be understood that the ratio of the length of the shaft to its cross-section is approximately in the order of or greater than a few hundred.

Shaft 10 may be made of certain types of metal, plastic, and other suitable elastic materials and have a relatively high thermal coefficient of expansion.

In FIG. 1, the view is assumed to be from a vertical direction. The bearings are fixed to a base, which in FIG. 1 can be assumed to be the earth, so as to elastically arc and constrain shaft 10 into a circular quadrant. The circular arc is illustrative only. Ideally, the degree of arc for maximum efficiency should approach but not reach the elastic limit of the shaft. A rack gear 14 is mounted about the periphery of the shaft at one end. A pinion gear 16 meshes with the rack gear 14 to couple rotational movement of the shaft to any appropriate utilization device 20. In the embodiment of FIG. 1, a torque converter 18 is illustratively interposed between the pinion gear and the utilization device to, for example, establish the output torque and angular velocity to the utilization device 20 as desired. It is understood, of course, that a suitable means for coupling rotational energy from the shaft may be located at any desired point along the shaft.

If a sufficient amount of thermal energy is now applied primarily to the concave surface of shaft 10 substantially along its entire axis, the shaft will elastically rotate about its axis. It is assumed that the source of energy in FIG. 1 is sunlight. Ideally, light rays should impinge on all portions of the shaft having underlying material is a compressed state as a result of the shaft arc. This is not necessary, however, for shaft rotation to occur. I have observed the rotation of both metal and plastic shafts, mounted horizontally to the earth in the configuration of FIG. 1, under the influence of a noon day sun. The velocity of rotation was in the order of a few revolutions per minute. The shafts had axial lengths of approximately 200 feet and diameters in the order of a few inches.

To the best of my understanding and belief, the theory of operation is as follows. The material forming the concave surface of the arced shaft tends to expand as it is heated to a temperature higher than the temperature of the shaft material forming the convex surface. As a result, the shaft attempts to straighten. Because it cannot do so as a result of the bearings, the shaft must rotate about its axis in the bearings to allow the compressed shaft material to expand. As rotation occurs, cooler portions of the shaft are exposed and heated by the sunlight, thereby causing the rotation to continue.

Figure 2:
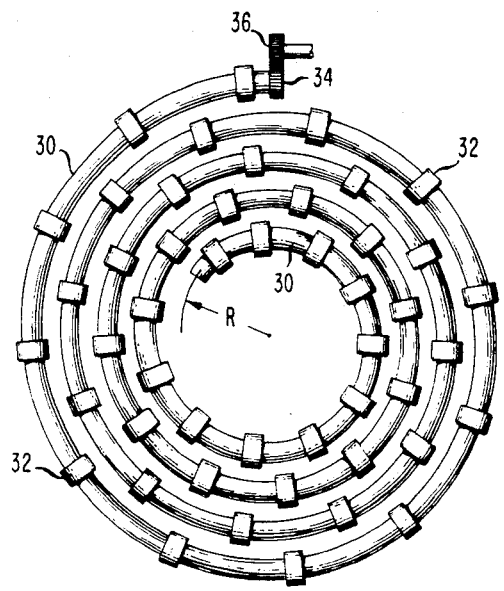
FIG. 2 is an embodiment of the invention in which a circular shaft is arced into a planar spiral configuration. This embodiment also illustratively uses solar energy as a source of heat.

FIG. 2 shows an illustrative embodiment of the invention similar to that of FIG. 1, but in which a shaft 30 is elastically arranged into a planar spiral. Again, a plurality of bearings 32 support and constrain the shaft. A rack 34 and pinion 36 couple rotational energy from the shaft as in FIG. 1. The minimum radius R of the spiralled shaft is shown in FIG. 2 and is such as not to exceed the elastic limit of the shaft material. By way of example, shaft 30 is assumed to be hollow (a pipe) and to have large dimensions. For instance, the axial shaft length and the shaft diameter might be in the order of thousands of feet and ten or tens of feet, respectively. Such a structure might be located in a hot climate such as a desert, for example, and used during periods of sunlight to generate electrical power.

Figure 3:
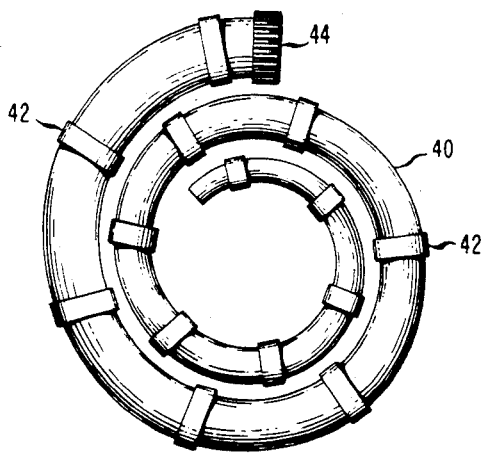
FIG. 3 shows a variation of the embodiment of FIG. 2 in which the diameter of the circular shaft gradually increases along the axis of the spiral in a direction toward the outside of the spiral. This embodiment minimizes certain elastic stresses in the shaft along its axis which occur in the configuration of FIG. 2 because of the decreasing degree of arc present in the shaft as the spiral is traversed from its center toward its outside.

The shaft of the planar spiral shown in FIG. 2 is assumed to have a constant diameter through its axial length. Because the radius of the spiral continually increases along the axis of the shaft in a clockwise direction, the compression of the shaft material on the concave wall near the center of the spiral is greater than the compression of the corresponding shaft material at outer portions of the shaft. FIG. 3 shows a variation of the embodiment of FIG. 2 in which the compressive forces are made equal along the axial length of the shaft. Spiralled shaft 40, bearing 42 and rack gear 44 are shown in FIG. 3. The diameter of the shaft 40 is relatively small at the center of the spiral and gradually increases by an amount sufficient to equalize the compressive forces as the spiral radius increases.

Figure 4:
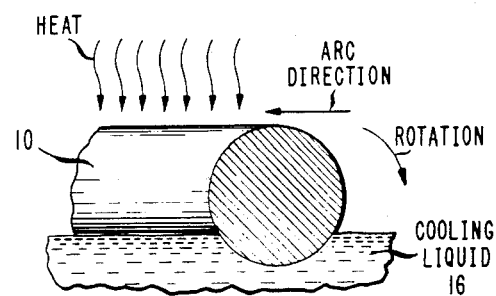
FIG. 4 illustrates a cross-sectional view of a circular and hollow arced shaft in which radiant heat is applied to part of the concave surface of the shaft and part of the convex surface of the shaft is immersed in a cooling bath to increase the efficiency of energy conversion.

There are a number of techniques of increasing the efficiency of energy conversion in the apparatus described above. FIG. 4 shows a cross-section of shaft 10 taken at 4—4 of FIG. 1. By way of example, it is assumed here that shaft 10 is solid. Shaft 10 is immersed in a liquid 16, such as water, to cool part of the convex surface of the shaft located on the opposite side of the source of heat. The forced cooling aids the contraction of part of the shaft that is in a state of tension, thereby enhancing the tendency of the shaft to straighten.

Figure 5:
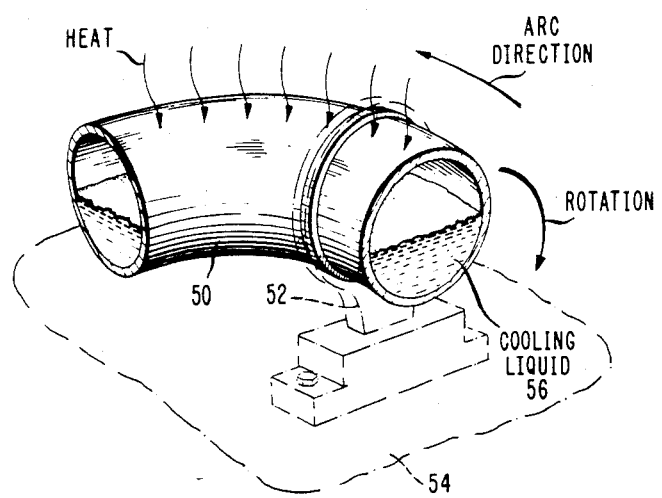
FIG. 5 illustrates one variation of the embodiment of FIG. 4 in which a cooling liquid is pumped through the hollow shaft.

FIG. 5 illustrates a variation of the embodiment of FIG. 4 in which a cooling liquid 56 is pumped through a hollow shaft. In this FIG., a journal 52 is illustratively shown in phantom as being mounted to a suitable base 54, which might be a concrete slab, for instance.

Figure 6:
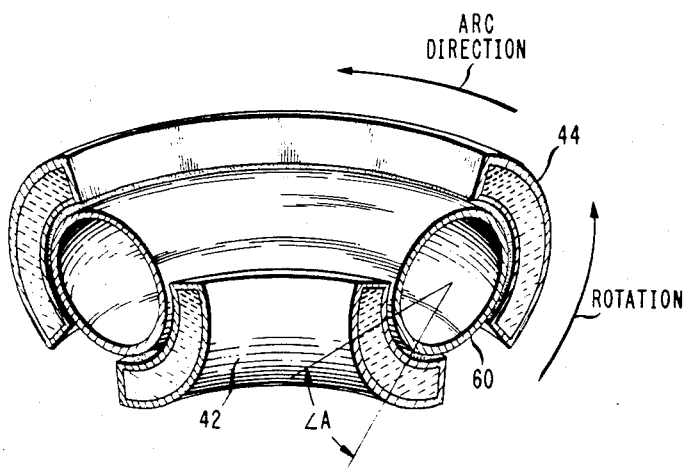
FIG. 6 illustrates a further embodiment of the invention in which thermal energy is applied to the concave surface of an arced shaft by means of a manifold containing a heated fluid and located in proximity to and running substantially the length of the shaft. A second manifold containing a cooled fluid is located in proximity to the convex surface of the shaft.

FIG. 6 illustrates part of a hollow shaft 60 in one embodiment of the invention which does not depend on sunlight as a source of thermal energy. As shown in FIG. 6, the arc of shaft 60 is assumed to be directed to the left. A manifold 42 runs the axial length of the shaft in proximity to its concave surface. A heated fluid, such as water, is pumped through this manifold to, in turn, heat the concave surface of the shaft. The center of manifold 42, and, correspondingly, the zone of heating of the concave surface of the shaft, is offset downward by a small angle A from an imaginary line running the length of the shaft at the center of the concave surface. This insures rotation of shaft 60 in a counterclockwise direction. The rotational direction can be reversed by offsetting manifold 42 upward of the imaginary line, whereas the direction of rotation is unpredictable and unstable if manifold 42 is exactly centered on the concave shaft surface. To further increase the efficiency of this apparatus, a cooling fluid may be pumped through a second manifold 44 located close to the convex surface of and running the length of shaft 40.

Figure 7:
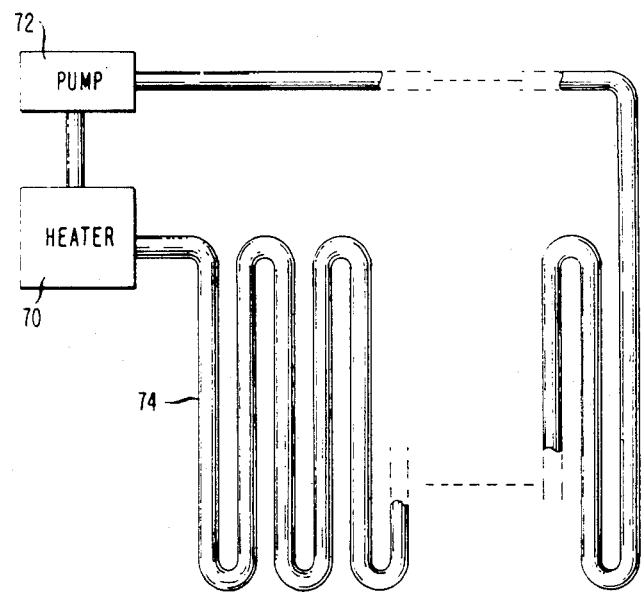
FIG. 7 illustrates a canopy comprising a pipe formed into a planar grid. A closed system is provided by a heater and pump for pumping a heated fluid through the grid. The canopy covers the planar spiral configuration shown in FIG. 2 and provides one alternative to sunlight as a source of thermal energy.

As a further alternative to sunlight as a source of heat, a heating jacket or canopy may be placed in proximity to a portion of or all of the concave surface of an arced shaft. FIG. 7 illustrates one such arrangement suitable for the embodiments of the invention shown in FIGS. 1 and 2. A fluid, such as water, is heated by a conventional device 70 and pumped by device 72 through a planar grid of pipes 74. The grid is placed immediately above the spiral apparatus of FIG. 2. As a result, the temperature of the upper surface of the spiralled shaft 30 is elevated in a manner similar to the effect caused by a noon day sun. Similarly, a cooling grid may be located beneath the planar spiral to increase the conversion efficiency.

In view of this teaching, numerous other embodiments of the invention become apparent. For example, a shaft may be arranged in a cylindrical spiral (a coiled spring configuration). In this configuration, a means of heating the inside concave surface of the spiral would be applied. A cylindrical arrangement of heating pipes for example, located inside the cylindrical spiral could heat the concave shaft surface to achieve rotation. It is thus apparent that the embodiments of the invention discussed herein are illustrative of the invention and not limiting and that numerous other variations of the invention, within the scope of this teaching, are possible.

What is claimed is:

1. Apparatus for converting solar energy into rotational energy, comprising
    a shaft of elastic material having a relatively high thermal coefficient of expansion and an axial length much greater than its cross-sectional dimension,
    a plurality of journals located at prescribed points along the shaft, and
    a plurality of circular bearings for receiving the journals, each bearing fixedly mounted to a base and positioned for supporting and constraining the shaft into a spiral oriented so that the inside concave surface is heated by the solar energy and in which the shaft material and the radius of curvature is selected such that the elastic limit of the shaft is not exceeded.

2. The invention of claim 1 further comprising means for coupling rotational movement of the shaft about its axis to a second device.

3. The invention of claim 1 in which the bearing constrain the shaft into a planar spiral.

4. The invention of claim 3 wherein the shaft has a gradually increasing cross-sectional diameter in a direction toward the outside of the spiral.

5. Apparatus for directly converting thermal energy into rotational energy, comprising
    a shaft of elastic material having a relatively high thermal coefficient of expansion and an axial length much greater than its cross-sectional diameter,
    a plurality of journals located at prescribed points along the shaft,
    a base,
    a plurality of circular bearings mounted to the base for receiving the journals when the shaft is elastically arced and thereby constraining the shaft into a spiral having a radius of curvature large enough so that an elastic limit of the shaft is not exceeded,
    means for directing heat to an angular portion of the concave surface of the shaft substantially along its entire length, and
    means for coupling rotational movement of the shaft about its axis to a second device.

6. The invention of claim 5 wherein said coupling means further comprises
    a pinion gear, and
    a rack gear circumscribing the periphery of the shaft at a prescribed point along the shaft axis for meshing with the pinion gear.

7. The invention of claim 5 wherein the spiral is planar with a continuously increasing radius of curvature.

8. The invention of claim 7 wherein the heat directing means further comprises
    a canopy located proximate to one planar surface of the spiral and covering substantially the whole of the one surface, and
    means for heating the canopy substantially uniformly.

9. The invention of claim 7 wherein said heat directing means comprises
    a grid of water pipes located parallel to and in proximate position to one planar surface of the spiral, and
    pump means for pumping hot water through the grid.

10. The invention of claim 5 further comprising
    means for cooling an angular portion of the convex surface of the shaft substantially along its entire length.

11. The invention of claim 10 in which the means for cooling further comprises
    a liquid coolant into which the shaft is partially submerged.

12. The invention of claim 10 wherein the shaft is hollow and the means for cooling further comprises
    a liquid coolant pumped through the shaft.

13. The invention of claim 5 wherein the heat directing means further comprises
    a manifold located proximate to the concave surface of the arced shaft substantially along the entire length of the shaft.

14. The invention of claim 13 further comprising
    a second manifold located proximate to the convex surface the arced shaft substantially along the entire length of the shaft for cooling the convex surface.

15. The invention of claim 5 wherein the shaft has a gradually increasing cross-sectional diameter in a direction along its axial length toward the outside of the spiral.

* * * * *